United States Patent
Fick et al.

(10) Patent No.: US 10,738,897 B2
(45) Date of Patent: Aug. 11, 2020

(54) O-RING LUBRICATION SYSTEM

(71) Applicant: GP Companies, Inc., Mendota Heights, MN (US)

(72) Inventors: David Ted Fick, Cannon Falls, MN (US); Scott Maurice Christopherson, South St. Paul, MN (US)

(73) Assignee: GP Companies, Inc., Mendota Heights, MN (US)

( * ) Notice: Subject to any disclaimer, the term of this patent is extended or adjusted under 35 U.S.C. 154(b) by 0 days.

(21) Appl. No.: 16/213,366

(22) Filed: Dec. 7, 2018

(65) Prior Publication Data

US 2019/0249783 A1 Aug. 15, 2019

Related U.S. Application Data

(60) Provisional application No. 62/629,365, filed on Feb. 12, 2018.

(51) Int. Cl.
*F16K 11/07* (2006.01)
*F16K 5/22* (2006.01)

(52) U.S. Cl.
CPC ......... *F16K 5/225* (2013.01); *Y10T 137/8671* (2015.04)

(58) Field of Classification Search
CPC ... F01M 11/00; F16K 3/36; Y10T 137/86694; Y10T 137/86791; Y10T 137/87748; Y10T 137/87756
USPC ............................................ 184/24; 251/355
See application file for complete search history.

(56) References Cited

U.S. PATENT DOCUMENTS

| | | | |
|---|---|---|---|
| 2,030,458 A | 2/1936 | McKellar et al. | |
| 2,068,810 A * | 1/1937 | Mccausland | F16K 3/36 137/246.13 |
| 2,235,307 A | 12/1938 | Atkinson | |
| 2,796,230 A | 6/1957 | Grove et al. | |
| 3,123,078 A | 3/1964 | Brooks | |
| 3,199,876 A * | 8/1965 | Magos | F16J 15/181 277/500 |
| 3,544,064 A * | 12/1970 | Bernard | F16K 41/00 251/214 |
| 3,563,273 A * | 2/1971 | Mills | F15B 13/04 137/625.69 |
| 5,244,183 A * | 9/1993 | Calvin | F16J 15/004 137/312 |
| 5,607,165 A * | 3/1997 | Bredemeyer | F16J 15/406 277/320 |

(Continued)

*Primary Examiner* — Robert K Arundale
(74) *Attorney, Agent, or Firm* — Brian D. Kaul; Westman, Champlin & Koehler, P.A.

(57) ABSTRACT

A pressure regulator includes a cylinder and a piston contained in the cylinder. First and second O-rings are attached to the cylinder and configured to form a seal between the cylinder and an interior wall of the piston. The pressure regulator has a lubrication system that includes a lubrication reservoir between the first and second O-rings defined by an annular groove in an exterior surface of the piston and the interior wall of the cylinder, and an input port extending through the cylinder to the lubrication reservoir. The piston is configured to move along a central axis relative to the cylinder between first and second positions. The first and second O-rings are displaced from the input port during movement of the piston between the first and second positions.

20 Claims, 6 Drawing Sheets

(56) References Cited

U.S. PATENT DOCUMENTS

| | | | | |
|---|---|---|---|---|
| 5,732,731 | A * | 3/1998 | Wafer | F16K 41/023 137/312 |
| 5,988,591 | A * | 11/1999 | Akimoto | F16K 11/0712 251/324 |
| 9,528,631 | B2 * | 12/2016 | McCarty | F16K 41/02 |
| 2003/0201020 | A1 * | 10/2003 | Kulmann | F15B 13/0402 137/625.69 |
| 2005/0067031 | A1 * | 3/2005 | Lee | F15B 13/0402 137/625.69 |

\* cited by examiner

O-RING LUBRICATION SYSTEM

CROSS-REFERENCE TO RELATED APPLICATION

The present application is based on and claims the benefit of U.S. provisional patent application Ser. No. 62/629,365, filed Feb. 12, 2018, the content of which is hereby incorporated by reference in its entirety.

BACKGROUND

Piston and cylinder arrangements are used in a variety of mechanical devices, such as valves and pressure regulators, for example. O-rings are commonly used to form a seal between an outer wall of the piston and an interior wall of the cylinder, in which the piston is supported for slidable movement relative to the cylinder. The O-rings are typically received within an annular groove of the outer wall of the piston, and slide against the interior wall of the cylinder during movement of the piston relative to the cylinder.

A lubricant, such as grease, is generally coated on the O-rings and the walls of the cylinder and piston to reduce friction between the interior wall of the cylinder and the O-ring. This extends the life of the O-ring and, thus, the operational life of the mechanical device, in which the O-ring is being used.

The amount of lubricant available to lubricate the O-ring is generally reduced over time due to use of the mechanical device. As a result, it is necessary to periodically replenish the lubricant. This generally involves disassembling the mechanical device and applying a new coating of lubricant to the O-rings and the walls of the piston and cylinder.

SUMMARY

Embodiments of the present disclosure are directed to a mechanical device that includes a lubrication system for maintaining lubrication of O-rings of the device during operation.

One mechanical device in accordance with embodiments of the present disclosure is in the form of a pressure regulator that includes a cylinder and a piston contained in the cylinder. First and second O-rings are attached to the cylinder and configured to form a seal between the cylinder and an interior wall of the piston. The pressure regulator has a lubrication system that includes a lubrication reservoir between the first and second O-rings defined by an annular groove in an exterior surface of the piston and the interior wall of the cylinder, and an input port extending through the cylinder to the lubrication reservoir. The piston is configured to move along a central axis relative to the cylinder between first and second positions. The first and second O-rings are displaced from the input port during movement of the piston between the first and second positions.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION OF ILLUSTRATIVE EMBODIMENTS

Embodiments of the present disclosure are described more fully hereinafter with reference to the accompanying drawings. Elements that are identified using the same or similar reference characters refer to the same or similar elements. The various embodiments of the present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art.

The terms "about" and "substantially" are used herein with respect to measurable values and ranges due to expected variations known to those skilled in the art (e.g., limitations and variabilities in measurements).

The word "exemplary" is used herein to mean "serving as an example, instance or illustration." Any embodiment described as "exemplary" is not necessarily to be construed as preferred or advantageous over other embodiments and/or to exclude the incorporation of features from other embodiments.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

Figure 1:
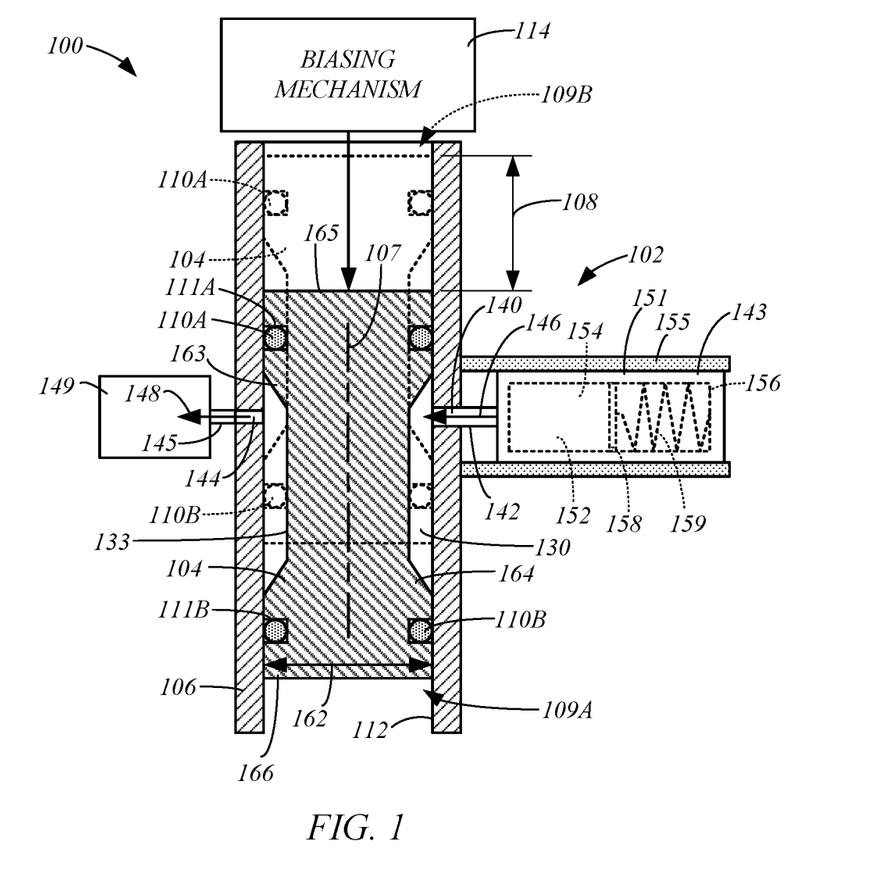
FIG. 1 is a simplified cross-sectional view of an exemplary mechanical device including an exemplary O-ring lubrication system, in accordance with embodiments of the present disclosure.

Embodiments of the present disclosure are directed to a mechanical device having an O-ring lubrication system. FIG. 1 is a simplified cross-sectional view of an exemplary mechanical device 100 including an exemplary O-ring lubrication system 102, in accordance with embodiments of the present disclosure. The exemplary device 100 includes a cylindrical piston 104 and a cylinder 106. The piston 104 is contained within the cylinder 106 and is configured to slide along a central axis 107 of the piston 104 and the cylinder 106 over a travel length 108 along the axis 107 between a first position 109A, which is shown in solid lines, and a second position 109B, which is shown in phantom lines. Thus, the first and second positions 109A and 109B correspond to the limits the piston 104 can travel within the cylinder 106 along the axis 107 during operation of the device 100.

The device 100 also includes at least one O-ring 110, such as the O-rings 110A and 110B shown in FIG. 1, each of which is received within a corresponding annular groove 111 formed in the piston 104, such as grooves 111A and 111B.

In some embodiments, the grooves 111 are each concentric and perpendicular to the central axis 107. Each of the O-rings 110 operates to form a seal between the piston 104 and an interior wall 112 of the cylinder 106.

The lubrication system 102 operates to lubricate the O-rings 110 during use of the device 100 with a lubricant (e.g., grease). Additionally, the lubrication system 102 allows the O-rings 110 of the device 100 to be periodically replenished with the lubricant without having to disassemble the device 100, thereby extending the operating life of the device 100 while avoiding costly maintenance associated with conventional mechanical devices.

In some embodiments, the device 100 includes a biasing mechanism 114 that is configured to bias the piston 104 toward the first position. The biasing mechanism 114 may comprise a spring or another suitable biasing mechanism.

The device 100 may take on many different forms while utilizing the lubrication system 102. For example, the device 100 may take the form of a valve (e.g., solenoid valve), a pressure regulator, an unloader, or another mechanical device. Thus, it is understood that the piston 104 and the cylinder 110 shown in FIG. 1 may form only a portion of the device 100.

Figure 2:
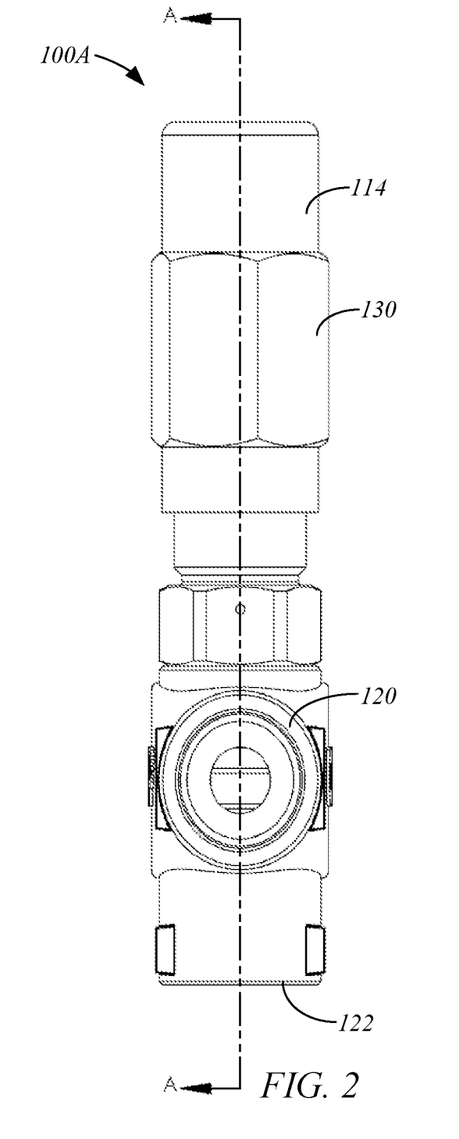
FIG. 2 is a front view of an exemplary pressure regulator, in accordance with embodiments of the present disclosure.
Figure 3:
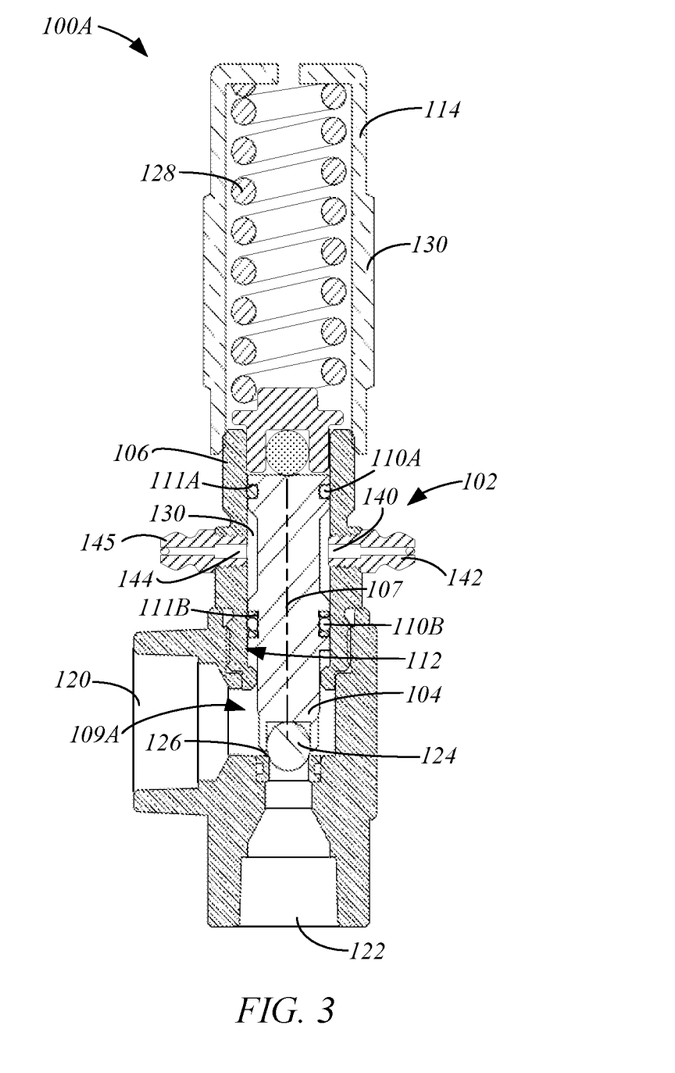
FIGS. 3 and 4 are cross-sectional views of the pressure regulator of FIG. 2 taken generally along line A-A.
Figure 4:
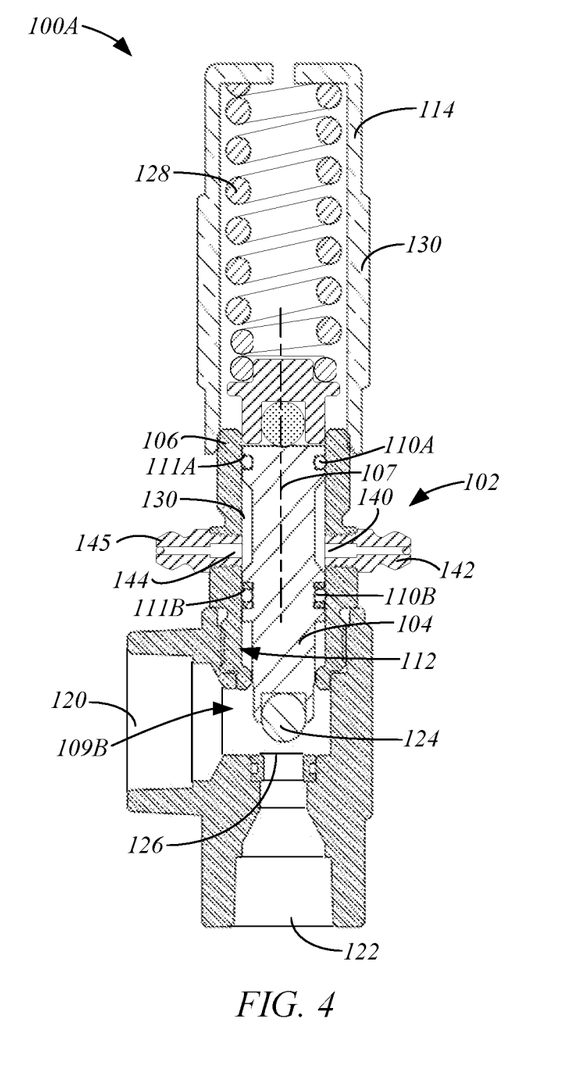

FIGS. 2-4 illustrate an exemplary mechanical device 100 in the form of a pressure regulator, with which embodiments of the lubrication system 102 may be used. FIG. 2 is a front view of the pressure regulator 100A. FIGS. 3 and 4 are cross-sectional views of the pressure regulator 100 taken generally along line A-A of FIG. 2. The pressure regulator 100A includes an inlet 120, an outlet 122, and a valve body 124 attached to the piston 104. The piston 104 is configured to move along the axis 114 between a closed position 109A (FIG. 3), in which the valve body 124 engages a valve seat 126 at the outlet 122 to substantially block the flow of fluid from the inlet 120 to the outlet 122, and an open position 109B (FIG. 4), in which the piston 104 and the valve body 124 are displaced from the valve seat 126 to allow fluid to flow from the inlet 120 to the outlet 122.

The piston 104 is biased toward the valve seat 126 and the closed position 109A using a biasing mechanism 114, which may include a spring 128 contained in a housing 130, or other suitable biasing mechanism. When the pressure at the inlet 104 exceeds a threshold pressure, the force applied to the piston 104 by the biasing mechanism 114 is overcome by the fluid pressure, and the piston 104 is driven along the axis 107 to displace the valve body 124 from the valve seat 126 toward the open position 109B, thereby allowing the pressure and the fluid to be released from the inlet 120 to the outlet 126, in accordance with conventional pressure regulators.

The lubrication system 102 operates to maintain lubrication of the O-rings 110A and 110B that are attached to the piston 104 during operation of the pressure regulator 100A. The O-rings 110A and 110B provide a double seal between the piston 104 and the interior wall 112 of the cylinder 106 to prevent fluid from leaking from the inlet 120 past the piston 104.

Figures 5, 7:
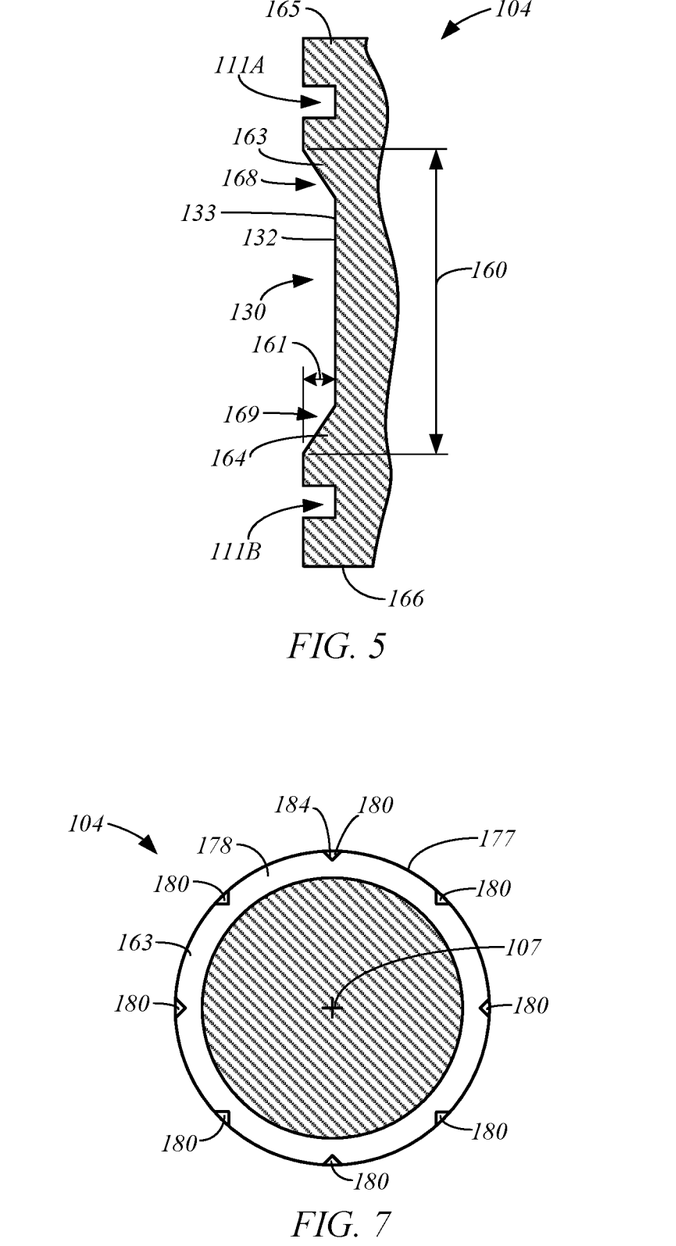
FIG. 5 is a side cross-sectional view of a portion of a piston that includes a reservoir of an O-ring lubrication system, in accordance with embodiments of the present disclosure.
FIG. 7 is a cross-sectional view of an exemplary piston, in accordance with embodiments of the present disclosure.

In some embodiments, the lubrication system 102 includes a lubrication reservoir 130 between the O-rings 110A and 110B. FIG. 5 is a side cross-sectional view of a portion of the piston 104 that includes the reservoir 130. In some embodiments, the lubrication reservoir 130 is formed by an annular groove 132 in the exterior wall 133 of the piston 104, which may be coaxial to the axis 107. In some embodiments, the exterior wall 133 of the piston 104 at the reservoir 130 is displaced a greater distance from the interior wall 112 of the cylinder 106, than the exterior wall of the piston 104 surrounding the O-rings 110A and 110B, as shown in FIG. 1.

The lubrication system 102 also includes an input port 140 formed in the cylinder wall 106, which allows lubricant to be injected into the reservoir 130. In some embodiments, the input port 140 may include a fitting 142, such as a zerk fitting or other suitable fitting, that is coupleable to a supply of lubricant 143 (FIG. 1). The user may inject lubricant from the supply 143 through the input port 140 and into the reservoir 130. In some embodiments, after the reservoir 130 is filled with lubricant, the input port 140 may be sealed using a suitable plug (not shown).

In some embodiments, the lubrication system 102 includes an output port 144 through the cylinder wall 106 that is open to the reservoir 130. The output port 144 allows the reservoir 130 to be purged of gas and/or liquid during the filling of the reservoir 130 with lubricant through the input port 140. In some embodiments, the output port 144 may include a fitting 145 (FIG. 3), such as a zerk fitting or other suitable fitting. The fitting 145 may, for example, facilitate coupling the output port 144 to a collector 149 for collecting lubricant discharged through the output port 144, as shown in FIG. 1.

A user may fill the reservoir 130 by connecting a suitable supply 143 of lubricant to the input port 140 and injecting lubricant into the reservoir 130 from the supply 143, as indicated by arrow 146. As the reservoir 130 fills with the lubricant, gas and/or fluid, is purged from the reservoir 130 through the output port 144, as indicated by arrow 148. The user knows when the reservoir 130 is generally filled with the lubricant when lubricant escapes through the output port 144. As mentioned above, the lubricant that is discharged through the output port 144 may be collected by the collector 149.

The lubricant supply 143 comprises a container 151 containing a volume of lubricant 152 within an interior chamber 154. In some embodiments, the lubricant supply 143 is directly attached to the device 100 by a support member 155, such as a bracket, a socket (shown), or other suitable support member.

In some embodiments, the volume of the interior chamber 154 of the container 151 may be compressed using any suitable technique to drive the lubricant 152 through the input port 140 and into the reservoir 130. For example, the container 151 may be compressed by hand to discharge the lubricant 152. Other configurations of the lubricant supply 143 may also be used.

In some embodiments, the lubricant supply 143 includes a discharge mechanism 156 for discharging the lubricant 152 through the input port 140 and into the reservoir 130. Thus, the lubricant supply 143 may be directly attached to the device 100, such as by the support member 155, and provide a supply of lubricant to the reservoir 130 either automatically as the supply of lubricant within the reservoir decreases, or upon actuation by a user of the device 100.

The mechanism 156 may take on any suitable form. In one embodiment, the mechanism 156 includes a piston 158 and a spring member 159 that biases the piston 158 to discharge the lubricant 152 from the supply 143. A user may actuate the mechanism 156 using any suitable actuation mechanism to discharge a volume of lubricant 152 through the input port 140 using the piston 158. Other suitable mechanisms 156 may also be used to discharge the lubricant from the supply 143.

In some embodiments, the separation between the O-rings 110A and 110B is selected such that they do not engage the input port 140 or the optional output port 144 during movement of the piston 104 relative to the cylinder 110. Thus, with the input port 140 and/or the output port 144 centrally positioned relative to the range of motion 108 of the piston 104 along the axis 107, the O-rings 110A and 110B are displaced from the input port 140 and/or the output port 144 a distance of greater than one-half the range of motion 108.

In some embodiments, the reservoir 130 has a length 160 (FIG. 5) measured along the axis 107 that is greater than about 0.35 inch, such as greater than 0.50 inch, greater than 0.60 inch, and greater than 0.70 inch, such as 0.72 inch. The length 160 may also be based on the travel length or distance 108 (FIG. 1). In some embodiments, the length 160 is less than about 90% of the travel length 108, such as about 60-90% of the travel length 108, about 70-90% of the travel length 108, and about 80-90% of the travel length 108.

Additionally, the groove 132 has a maximum depth or distance 161 relative to the exterior surface of the piston 104 adjacent the O-rings 110A and measured in a plane that is perpendicular to the axis 107 that is greater than about 0.060 inch, such as greater than about 0.70 inch, and greater than about 0.80 inch, such as about 0.085 inch. In some embodiments, the maximum depth 161 may be related to the maximum diameter 162 (FIG. 1) of the piston 104. For example, the depth 161 may be greater than about 5% of the diameter 162, such as, for example, about 5%, 10%, 15%, 20%, 25%, or 30% of the diameter 162. For example, when the diameter 162 of the piston 104 is about 0.700 inch, the diameter of the piston 104 at the location of the maximum depth 161 may be about 0.530 inch.

In some embodiments, the exterior wall 133 of the piston 104 defining the reservoir 130 includes tapered ends 163 and 164, which respectively taper toward the interior wall 112 of the cylinder 110 with distance toward ends 165 and 166 of the piston 104. The tapered ends 163 and 164 respectively define tapered end portions 168 and 169 of the reservoir 130. In some embodiments, the tapered ends 163 and 164 are oriented at an angle of about 10°-60° from the central axis 107. The tapered ends 163 and 164 facilitate movement of lubricant toward the interior wall 112 of the cylinder 106 during movement of the piston 104 along the axis 107, which aides in the lubrication of the O-rings 110A and 110B.

Figure 6:
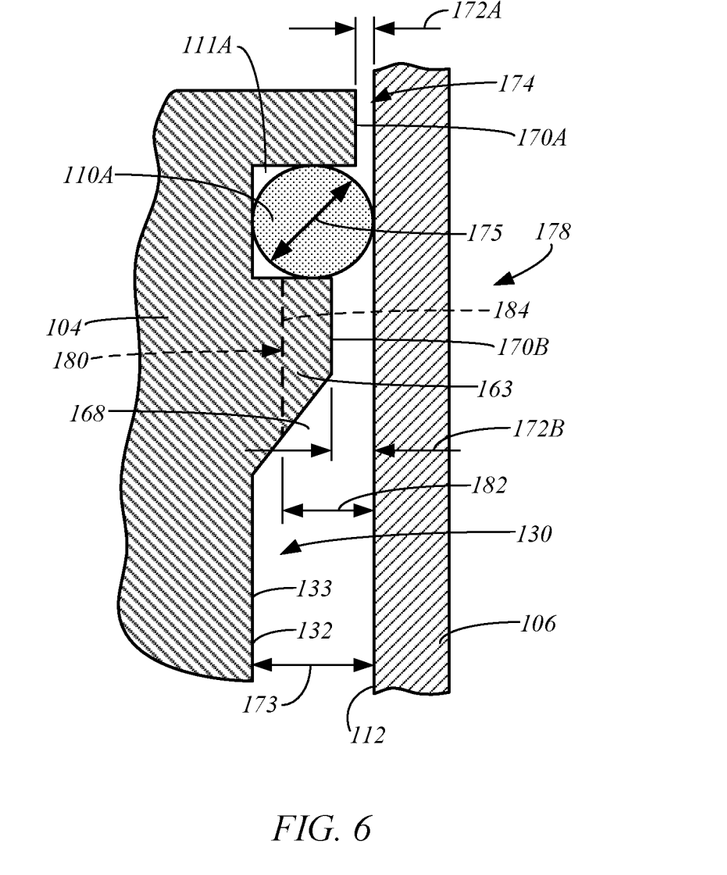
FIG. 6 is a magnified side cross-sectional view of a portion of a piston, an O-ring, and a cylinder wall, in accordance with embodiments of the present disclosure.

FIG. 6 is a magnified side cross-sectional view of a portion of the piston 104, the O-ring 110A, and the cylinder 106. In some embodiments, the exterior surface of the piston 104 surrounding the groove 111A (shown) and 111B, generally referred to as 170, is positioned closer to the interior wall 112 of the cylinder than the exterior surface 133 of the piston 104 within the reservoir 130. As a result, a gap between the interior wall 112 and the exterior surface 170, which is measured in a plane that is perpendicular to the axis 107 and generally referred to as 172, is less than a maximum gap 173 of the reservoir 130 between the interior wall 112 and the exterior surface 133, as shown in FIG. 6. In some embodiments, the gap 173 is much greater than the gap 172 by about the maximum depth 161 (FIG. 5) of the groove 132. In some embodiments, the gap 172 is less than about 50% of the gap 173, such as less than about 40%, less than about 30%, less than about 20%, and/or less than about 10% of the maximum gap 173, for example. In some embodiments, the gap 172 is about 0.002-0.015 inch.

In some embodiments, the piston 104 is formed to have an annular gap 172A between the exterior surface 170A of the piston 104 on a non-reservoir-side 174 of the O-ring 110A, in which the groove 111A is formed, and the interior surface 112 of the cylinder 106. In some embodiments, the gap 172A, which is measured in a plane that is perpendicular to the axis 107, is approximately 0.002-0.010 inch, such as less than 0.005 inch and 0.004 inch or less. In some embodiments, the gap 172A is greater than 6% of the diameter 175 of the O-ring 110A when in an uncompressed state. The same or similar gap may also be provided on the piston 104 on the non-reservoir-side of the O-ring 110B, in which the groove 111B is formed.

In some embodiments, the piston 104 is formed to have an annular gap 172B between an exterior surface 170B of the piston 104 on a reservoir-side 178 of the O-ring 110A, in which the groove 111A is formed, and the interior surface 112 of the cylinder 106. In some embodiments, the gap 172B is larger than the gap 172A, such as greater than 105% of the gap 172A, greater than 110% of the gap 172A, or greater than 120% of the gap 172A, for example. In some embodiments, the gap 172B is greater than 0.005 inch, such as greater than 0.010 inch, and 0.005-0.015 inch, for example. The reservoir-side 178 of the piston 104 adjacent the O-ring 110B and the groove 111B may also be formed to have the same or similar annular gap 172B between the piston 104 and the interior surface 112 of the cylinder 106.

The larger gap 172B facilitates lubrication of the O-ring 110A by increasing flow of the lubricant between the piston 104 and the interior wall 112 of the cylinder 106 on the reservoir-side 178, while the smaller gap 172A contains the lubricant between the O-rings 110A and 110B. The gap 172B is still formed small enough to maintain retention of the O-ring 110A within the groove 111A during operation of the device 100. In some embodiments, the larger gap 172B is approximately 10-35% of the diameter 175 of the O-ring 110A.

In some embodiments, the tapered ends 163 and 164 taper from the surface 133 at the maximum gap 173 from the interior wall 112 to the distance 172, such as distance 172A or 172B. This is generally illustrated for the tapered end 163 in FIG. 6, and the same or similar configuration may be used for the tapered end 164.

FIG. 7 is a cross-sectional view of an exemplary piston 104 taken in a plane that is perpendicular to the axis 107, in accordance with embodiments of the present disclosure. In some embodiments, notches 180 are formed in the exterior surface 177 of the piston 104 on the reservoir-side 178 of the O-ring 110A adjacent the groove 111A. The same or similar notches 180 may be formed in the exterior surface of the piston 104 on the reservoir-side of the O-ring 110B adjacent the groove 111B. In some embodiments, the notches 180 are angularly displaced from each other about the axis 107, as shown in FIG. 7. The angular spacing between the notches 180 about the axis 107 may be less than 60°, or greater than 30°, such as 15°, 30°, 45° or 60°, for example.

The notches 180 increase the gap between the exterior surface 177 and interior wall 112 of the cylinder 106 to facilitate greater flow of the lubricant between the piston 104 and the interior wall 112 of the cylinder 106 on the reservoir-side 178 than would be possible if the notches 180 were not present. Thus, the notches 180 operate similarly to the larger gap 172B (FIG. 6). In some embodiments, a gap 182 between an exterior surface 184 of the piston 104 within the notches 180 and the interior surface 112 of the cylinder 106 is larger than the gap 172B formed between the exterior surface 170B between the notches 180 of the piston 104 and the interior wall 112 of the cylinder 106, such as illustrated in FIG. 6, in which a notch 180 is illustrated by a phantom line. In some embodiments, the gap 182 is greater than the gap 172B, such as greater than 105%, such as greater than 110% of the gap 172B, greater than 120% of the gap 172B, greater than 130% of the gap 172B, greater than 140% of the gap 172B, and greater than 150% of the gap 172B, for example. Exemplary dimensions for the gap 182 include greater than 0.010 inch, such as 0.010-0.020 inch, for example.

In some embodiments, the notches 180 may be used to enhance the lubricant flow to the O-ring 110A provided by the larger gap 172B. Thus, while the gap 172B may be formed larger than the gap 172A while the O-ring 110A is retained within the groove 111A, the notches 180 provide an even larger gap 182 without adversely affecting the O-ring retaining capability of the reservoir-side 178 of the groove 111A. Alternatively, the gap 172B may be the same or similar to the gap 172A, while the notches 180 provide the desired pathway for the lubricant to flow to the O-ring 110A. Here, the smaller gap 172B may provide robust retention of the O-ring 110A, while the notches 180 enhance lubrication of the O-ring 110A.

Although the embodiments of the present disclosure have been described with reference to preferred embodiments, workers skilled in the art will recognize that changes may be made in form and detail without departing from the spirit and scope of the present disclosure.

What is claimed is:

1. A pressure regulator comprising:
   a cylinder;
   a piston contained in the cylinder;
   first and second O-rings attached to the piston and configured to form a seal between the piston and an interior wall of the cylinder;
   an inlet;
   an outlet having a valve seat;
   a valve body attached to the piston;
   a biasing mechanism; and
   a lubrication system comprising:
      a lubrication reservoir between the first and second O-rings defined by an annular groove in an exterior surface of the piston and the interior wall of the cylinder, the annular groove defining first and second tapered ends of the reservoir that are displaced from each other along the central axis, the first tapered end tapering toward the interior wall with distance along the central axis toward the first O-ring, and the second tapered end tapering toward the interior wall with distance along the central axis toward the second O-ring; and
      an input port extending through the cylinder to the lubrication reservoir;
   wherein:
      the piston is configured to move along a central axis relative to the cylinder between first and second positions;
      the first and second O-rings are displaced from the input port during movement of the piston between the first and second positions;
      the biasing mechanism is configured to bias the piston toward the first position, in which the valve body engages the valve seat; and
      movement of the piston to the second position disengages the valve body from the valve seat.

2. The pressure regulator of claim 1, wherein the first and second tapered ends are angled at about 10°-60° from the central axis.

3. The pressure regulator of claim 1, wherein:
   the reservoir includes a maximum gap from the interior wall measured in a plane that is perpendicular to the central axis; and
   the first and second tapered ends extend from the maximum gap of the reservoir to a distance from the interior wall, measured in a plane that is perpendicular to the central axis, of about less than 10% of the maximum gap of the reservoir.

4. The pressure regulator of claim 3, wherein the maximum gap of the reservoir is greater than about 5% of a maximum diameter of the piston.

5. The pressure regulator of claim 3, wherein the first and second tapered ends extend from the maximum gap of the reservoir to a distance from the interior wall measured in a plane that is perpendicular to the central axis of about less than 50% of the maximum gap of the reservoir from the interior wall.

6. The pressure regulator of claim 1, wherein the first and second O-rings are respectively supported in first and second annular grooves within the piston.

7. The pressure regulator of claim 6, wherein:
   a non-reservoir side of the exterior surface of the piston, in which the first annular groove is formed, is displaced from the interior wall of the cylinder by a first non-reservoir side gap, measured in a plane that is perpendicular to the central axis, of about less than 50% of a maximum gap between the exterior surface of the piston within the reservoir and the interior wall of the cylinder measured in a plane that is perpendicular to the central axis; and
   a non-reservoir side of the exterior surface of the piston, in which the second annular groove is formed, is displaced from the interior wall of the cylinder by a second non-reservoir side gap, measured in a plane that is perpendicular to the central axis, of about less than 50% of the maximum gap.

8. The pressure regulator of claim 7, wherein:
   a reservoir side of the exterior surface of the piston, in which the first annular groove is formed, is displaced from the interior wall of the cylinder by a first reservoir side gap, measured in a plane that is perpendicular to the central axis, of about less than 50% of the maximum gap between the exterior surface of the piston within the reservoir and the interior wall of the cylinder; and
   a reservoir side of the exterior surface of the piston, in which the second annular groove is formed, is displaced from the interior wall of the cylinder by a second reservoir side gap, measured in a plane that is perpendicular to the central axis, of about less than 50% of the maximum gap.

9. The pressure regulator of claim 8, wherein the first non-reservoir side gap is greater than the first reservoir side gap, and the second non-reservoir side gap is greater than the second reservoir side gap.

10. The pressure regulator of claim 1, wherein the reservoir has a reservoir length measured along the central axis that is less than a travel distance the piston moves between the first and second positions.

11. The pressure regulator of claim 10, wherein the reservoir length is about 60-90% of the travel distance.

12. The pressure regulator of claim 1, further comprising a lubricant supply attached to the input port and containing a lubricant.

13. The pressure regulator of claim 12, further comprising a support member attached to the cylinder and supporting the lubricant supply.

14. The pressure regulator of claim 13, wherein the lubrication system includes a discharge mechanism for discharging the lubricant from the lubricant supply through the input port.

15. The pressure regulator of claim 1, further comprising an output port extending through the cylinder to the lubrication reservoir.

16. The pressure regulator of claim 1, wherein the lubrication system includes a lubricant contained in the lubrication reservoir.

17. The pressure regulator of claim 16, wherein the lubricant comprises grease.

18. A pressure regulator comprising:
a cylinder;
a piston contained in the cylinder;
first and second O-rings attached to the piston and configured to form a seal between the piston and an interior wall of the cylinder;
an inlet;
an outlet having a valve seat;
a valve body attached to the piston;
a biasing mechanism; and
a lubrication system comprising:
  a lubrication reservoir between the first and second O-rings defined by an annular groove in an exterior surface of the piston and the interior wall of the cylinder;
  an input port extending through the cylinder to the lubrication reservoir;
  an output port extending through the cylinder to the lubrication reservoir; and
  a lubricant contained in the reservoir;
wherein:
  the piston is configured to move along a central axis relative to the cylinder between first and second positions;
  the first and second O-rings are displaced from the input port during movement of the piston between the first and second positions;
  the biasing mechanism is configured to bias the piston toward the first position, in which the valve body engages the valve seat; and
  movement of the piston to the second position disengages the valve body from the valve seat.

19. The pressure regulator of claim 18, wherein the annular groove defines first and second tapered ends of the reservoir that are displaced from each other along the central axis, the first tapered end tapering toward the interior wall with distance along the central axis toward the first O-ring, and the second tapered end tapering toward the interior wall with distance along the central axis toward the second O-ring; and the first and second tapered ends extend from a maximum gap of the reservoir to a distance from the interior wall, measured in a plane that is perpendicular to the central axis, of about less than 10% of the maximum gap of the reservoir.

20. The pressure regulator of claim 19, wherein the lubricant comprises grease.

* * * * *